United States Patent Office 2,936,226
Patented May 10, 1960

2,936,226

SOIL NUTRIENT COMPOSITION AND METHOD FOR PREPARING SAME

John J. Kaufman, New Brighton, and Philip R. Templin, Oakmont, Pa., assignors to Gulf Research & Development Company, Pittsburgh, Pa., a corporation of Delaware No Drawing. Application June 20, 1955
Serial No. 516,750

2 Claims. (Cl. 71—1)

This invention relates to a method and means for supplying trace elements to soil to promote plant growth and enrichment, and has particular reference to a composition of matter which will yield trace elements to the soil, when said composition is added thereto, at a rate substantially equivalent to a rate at which the soil can absorb and the plant growth utilize such trace elements.

Our invention, briefly described, consists of a composition in which trace elements of the class useful in soil nutrition and in the form of finely divided water-soluble compounds such, for example, as an organic or inorganic salt, are distributed throughout a matrix composed of at least one water-insoluble waxy resinous binder selected from the class consisting of waxy synthetic resins, asphalt, and wax, such as microcrystalline or paraffin wax or mixtures thereof. Our invention includes also an improved method of delivering such nutritional trace elements to the soil, at the minuscule rate at which such trace elements can be absorbed and utilized, by mixing at least one finely divided water-soluble trace element compound with at least one liquefied binder, allowing the binder to solidify, thereafter comminuting the composition into small pieces which can range in length preferably from about 1/10" to 1", and distributing the pieces throughout the trace-element deficient soil. Trace elements can be liberated to the soil by aqueous leaching of our composition at a rate of only a few parts per day per million parts of moisture in deficient soil being treated.

The water-insoluble waxy resinous binder of our composition are solids at normal temperatures and melt at temperatures not higher than about 150° C. and preferably not higher than about 110° C. A preferred binder in our composition is paraffin wax derived from petroleum and melting in the range of about 50° to 80° C. This plentiful material is substantially inert, light in weight, and melts at such a low temperature that trace-element compounds can be easily mixed with the molten binder without fear of decomposition of the compound. Of the waxy synthetic resins useful as binders in our composition, low molecular weight polyethylene, i.e., polyethylene having a molecular weight between about 1000 and 10,000 and preferably between about 1000 to 6000, is especially suitable.

Low molecular weight resins can be mixed with wax to form the binder; one example of such mixture is that of a wax with a natural or synthetic rubber, prior to vulcanization. Asphalt can also be mixed with such resins.

Depending upon what plants are grown in a soil, several or all of the following elements are among those which must be present in trace concentrations in the soil to provide healthy and nutritive plants. These elements, which consequently constitute, in the form of water-soluble compounds, preferred constituents of our composition, include the following metals: molybdenum, iron, manganese, zinc, copper, nickel, cobalt, boron, and vanadium. The following table is an excerpt of one appearing in the article "Trace Elements" by Firman E. Bear, Journal of Agricultural and Food Chemistry, volume 2, No. 5, on pages 244-251. This table reports the concentrations of each of the above elements in some common foods or forages. It is well known that plants which are deprived of substantial amounts of the above trace elements and probably others, will be stunted and otherwise unhealthy and will be less nutritious than those containing a proper amount of trace elements.

TRACE ELEMENTS IN 16 PLANT SPECIES GROWN IN FIELD UNDER IDENTICAL CONDITIONS ON SASSAFRAS LOAM

[In p.p.m., on dry-weight basis.][1]

| Plants | Mo | Fe | Mn | Zn | Cu | Ni | Co | |
|---|---|---|---|---|---|---|---|---|
| Alfalfa, 1st Cutting | 0.9 | 261 | 27 | 27 | 8.3 | 1.15 | 0.14 | |
| Alfalfa, 2nd Cutting | 0.7 | 214 | 38 | ------ | 8.1 | 1.01 | 0.16 | |
| Ladino, 1st Cutting | 1.8 | 340 | 52 | 37 | 11.8 | 1.81 | 0.17 | Legume Hays. |
| Red Clover, 1st Cutting | 1.7 | 143 | 46 | 34 | 13.7 | 1.47 | 0.13 | |
| Soybean Forage | 1.6 | 212 | 53 | 31 | 11.2 | 0.91 | 0.12 | |
| Kentucky Blue Grass | 2.8 | 503 | 40 | 40 | 10.4 | 2.38 | 0.20 | |
| Orchard Grass | 4.8 | 231 | 77 | 29 | 8.2 | 1.58 | 0.09 | Grasses. |
| Sudan Grass | 1.0 | 135 | 22 | 32 | 7.0 | 0.66 | 0.05 | |
| Timothy | 2.7 | 144 | 34 | 36 | 6.9 | 1.10 | 0.06 | |
| Corn | 0.5 | 64 | 4 | ------ | 1.8 | 0.34 | 0.01 | |
| Oats | 3.2 | 178 | 38 | 37 | 6.8 | 0.91 | 0.02 | |
| Soybeans | 5.1 | 108 | 32 | 42 | 16.0 | 1.40 | 0.20 | Grains. |
| Sweet Corn | 0.6 | 38 | 3 | ------ | 3.2 | 0.40 | 0.01 | |
| Beet | 0.3 | 108 | 22 | ------ | 12.0 | 0.43 | 0.08 | |
| Lettuce | 0.4 | 136 | 36 | 45 | 13.1 | 1.50 | 0.07 | |
| Potato | 0.6 | 35 | 10 | ------ | 11.7 | 0.20 | 0.06 | Vegetables. |
| Spinach | 0.3 | 540 | 69 | 122 | 12.0 | 2.15 | 0.27 | |

[1] P.p.m. of trace elements found in the plants by analysis of the dry plants.

The composition can consist of between about 70 and 98 percent of resin, asphalt or paraffin wax and between about 2 and 30 percent of the finely divided water-soluble trace-element compounds. An excessive concentration of trace element (over 30 percent) will permit an excessive leaching of the trace element.

Leaching of the trace element and its delivery to the soil at a rate greatly in excess of that at which it can be absorbed will occur if large particles of the trace-element compound are employed, because the exposure of a single particle to the leaching action of water in the soil would permit too high a release rate. We have found that the average size of the particles must be less than about 5 millimeters in their largest dimension, and that about 95 percent by weight of the trace-element compound should pass a number 14 U.S. Standard Screen.

The particle size of the trace-element compound has a substantial effect on the leaching rate, particularly the initial leaching rate, since this rate reflects the relative amount of trace-element compound which is directly exposed either on the surface or through contact with soluble material on the surface with water in the soil. In the accelerated tests in which water was constantly in contact with our composition, particles having lengths between 0.05 and 0.21 millimeter (60% passed a No. 70 U.S. Standard Screen) yielded in five days in the leaching solution 17.5 milligrams of trace-element compound per gram of the composition. When the trace element varied in size from about 0.4 to 0.8 millimeter (80% passed a No. 20 U.S. Standard Screen), 18.8 milligrams of trace-element compound per gram of the composition were leached out in four days. Particles having a nearly uniform longest dimension of 1.8 millimeters yielded in four days 28.2 milligrams of trace-element compound per gram of the composition. Trace-element compound particles having a nearly uniform longest dimension of 4.8 millimeters yielded, in four days, 54.5 milligrams of trace-element compound per gram of the composition.

This rate, even taking into account the accelerated nature of the test, is higher than would be desirable under most circumstances.

Finely divided trace elements are usually released from our composition to the soil at two different rates in two different phases of soil treatment. During the first period, after addition of our composition to the soil, a portion of the trace-element compound is relatively rapidly released to the soil since this portion consists of particles at the surfaces of our comminuted composition or near the surface and in contact with other particles of trace-element compound. During the second period, the trace-element compound will be leached out more slowly, as hereinafter explained. In many cases it will be highly desirable to deliver trace elements at a relatively rapid rate to an impoverished soil until the soil has become enriched in the needed elements and thereafter to deliver trace elements at the much reduced rate at which plant life in the soil will absorb and utilize the trace elements. If, however, it is preferred to deliver trace elements at a single uniform slow rate, the composition may be coated with wax or other binder after it has been broken into the size that is delivered to the soil and then the initial rapid leaching will not occur.

Specific binders can be selected to provide an initial delivery rate suitable for the intended use. Crystalline material such as paraffin wax or polyethylene wax release trace-element compounds bound therein at a relatively rapid rate over quite an extended period so that these binders should be employed when the soil is most impoverished and needs a considerable supply of trace-element compounds before the rate should be reduced to one sufficient merely to maintain plant growth. Petroleum asphalt releases large quantities of trace-element compounds in a relatively short period and then show a highly reduced release rate.

A substantially stabilized leaching rate for each binder, which we have found is almost uniform over greatly extended periods and is established as soon as the period of rapid surface leaching has concluded, is to a great extent governed by the rate of transfer of water or aqueous solutions through thin films of the binder. Single crystals of trace-element compound which were carefully coated all over with paraffin wax exhibited a leaching rate of 101.2 milligrams in 153 days. A crystal of similar size, which was enclosed in a pressed sealed envelope of wax, exhibited a leaching rate of 153.3 milligrams in 153 days.

The more highly crystalline binders such as paraffin wax or polyethylene generally exhibit higher stabilized leaching rates than microcrystalline or amorphous binders such as petrowax or ozokerite. It is preferred to employ compositions which deliver trace-element compounds at the slowest obtainable rates so that treatment of a soil with the composition of our invention need not be repeated any more frequently than necessary. Compositions employing microcrystalline or amorphous binders and finely divided trace-element compounds should, according to our accelerated tests, continue to supply trace-element compounds to the soil over a period of about 3 years. It is therefore preferred to employ ozokerite or a microcrystalline wax whenever these amorphous binders are not so expensive that their use is prohibited. Slow leaching rates can economically be obtained by using mixtures of as low as about 5 percent of microcrystalline or amorphous binder with a remainder of a crystalline binder such as paraffin wax or polyethylene wax. Mixtures of 50 percent, by weight of ozokerite and 50 percent, by weight, of paraffin wax, polyethylene wax, or candelilla wax exhibit leaching rates that are not, as might be expected, the average of the rates of the two components of the mixtures but are instead, within the limits of experimental error, substantially the same as that of the ozokerite wax alone.

The addition of trace elements to soil by the use of our wax composition will show striking effects upon the rate of growth and character of the vegetation as compared to plants grown in trace-element deficient soil. Examples of this treatment would, however, primarily demonstrate the known effect of adding trace elements to deficient soil. The slow and ultimately uniform rate at which trace elements are made available by our composition can be quantitatively demonstrated in the laboratory. In the following examples, conditions were selected, i.e., water was maintained in constant contact with the wax composition, which would accelerate the rate of release of the trace elements, thus making it possible in a relatively short time, e.g., in periods of 100 to 200 days, to obtain results upon the basis of which one can predict the effect of a composition present in a soil over a period of several years.

*Example I*

A batch of molten wax was prepared containing 3 percent by total weight of mixed surface-active agents and 8.2 percent of colloidal attapulgus clay, the two latter materials acting together as a bodying agent. There was added to this mixture of wax and bodying agent 10 percent by weight, based on the total composition, of dry cupric sulfate ($CuSO_4 \cdot 5H_2O$). The mixture was stirred vigorously while cooling, and, after it had been cooled, it was cut into ¼" cubes. A number of the cubes having a total weight of about 100 grams was packed into a glass column. The cubes were thoroughly flushed, in the column, with distilled water to remove excess cupric sulfate from the exposed surfaces of the wax. The column was then filled with 200 grams of distilled water, and the water was allowed to remain in contact with the cubes of wax for a period of several days. The water was then withdrawn and another portion was added to the column and allowed to remain for several days; this process was continued throughout the entire test period.

The withdrawn water was tested for the presence of sulfate ion by the addition of barium chloride and such withdrawn portions of water continued to exhibit traces of cupric sulfate for the entire period (250 days) of the test. At the end of the test period, water withdrawn from contact with the wax composition contained 15 parts per million of cupric sulfate.

*Example II*

An aqueous solution of cupric sulfate was thoroughly mixed with a second batch of molten wax containing bodying agent in the same proportion as shown in Example I. Sufficient cupric sulfate solution was added to provide a 10 percent concentration of cupric sulfate in the wax mixture. Here again the molten wax was stirred rapidly while being cooled and the solid wax was cut into ¼" cubes. A number of the ¼" cubes weighing approximately 100 grams was placed in a glass column and the cubes were flushed with distilled water to remove excess copper sulfate solution from the surface of the cubes. The column was then filled with 200 grams of water which was allowed to remain in contact with the cubes for several days. The water was then withdrawn and replaced with an additional 200 grams of water. This process was repeated for a period of 250 days. Barium sulfate determinations of the concentration of cupric sulfate in the aqueous leachings withdrawn from the cubes after 250 days showed a concentration of about 5 parts per million.

*Example III*

A mixture of 130° F. (EMP) wax and about 10 percent of a bodying agent consisting of N-lauryl, N'-lauryl-adipamide was melted and 10 percent, based on the total weight of the composition, of dry cupric sulfate ($CuSO_4 \cdot 5H_2O$)

was added. The mixture was stirred rapidly during cooling and was then cut into ¼" cubes. A number of cubes weighing 107 grams was placed in a glass tube and the cubes were leached with distilled water to remove excess cupric sulfate from the surface of the cubes. As in the preceding examples 200 grams of distilled water were added and withdrawn periodically for a period of many days.

In the following Table I the results of contacting the wax cubes with water for a total period of 259 days are shown. The periods of days therein listed constitute the total number of days during which the cubes have been in contact with water. The difference between any listed period of days and the preceding period of days is the time that a single 200 gram portion of water was allowed to remain in contact with the wax. Since the concentration of the salt in the water was in every case so extremely low, no effect upon the solvent power of the water occurred to affect the solution rate. It will be observed that the solution rate after a period of about 81 days became nearly uniform and thereafter salt was released to the water at a rate of a few parts per million parts of water per gram of sample per day.

TABLE I

| Composition | Total Contact Time of Composition and Water, days | Cumulative Grams of Salt Leached Per Gram of Sample | Salt Leached Per Gram of Composition, Avg. Per Day, Grams |
|---|---|---|---|
| 81% 133° F. AMP Wax | 4 | 0.0188 | 0.0046 |
| 9% Bodying Agent | 13 | 0.0294 | 0.0022 |
| 10% CuSO₄.5H₂O | 28 | 0.0439 | 0.0015 |
| 107 grams of ¼" cubes added to column | 39 | 0.0518 | 0.0013 |
| | 78 | 0.0642 | 0.0008 |
| | 116 | 0.0736 | 0.0007 |
| | 168 | 0.0771 | 0.0004 |
| | 259 | 0.0793 | 0.0003 |

The average leaching rate reported above is the average daily rate over the entire preceding period of days.

*Example IV*

A mixture of wax, bodying agent, and surface active agent substantially the same as that described in Example I was melted and 10 percent by weight, based on the weight of the total composition, of cupric sulfate was added and thoroughly stirred with the molten wax. The cooled wax composition was cut into ¼" cubes and a number of these cubes having a total weight of 79 grams was placed in a glass column. The cubes were leached with distilled water to remove excess cupric sulfate from the surface of the cubes. After the leaching step, 200 cc. of water were introduced into the column and were held in contact with the wax cubes for a period of four days. This water was withdrawn and replaced with another 200 cc. portion. The withdrawn sample was analyzed for cupric sulfate content. This procedure was repeated for periods of increasing length and the results were as reported in Table II.

TABLE II

| Composition | Total Contact Time of Composition and Water, days | Cumulative Grams of Salt Leached Per Gram of Sample | Salt Leached Per Gram of Composition, Avg. Per Day, Grams |
|---|---|---|---|
| 80.1% 128° F. AMP Wax | 4 | 0.0220 | 0.0055 |
| 2.6% surface-active agent | 13 | 0.0288 | 0.0022 |
| 7.4% bodying agent | 28 | 0.0359 | 0.0013 |
| 9.9% CuSO₄.5H₂O | 39 | 0.0404 | 0.0010 |
| 79 grams of ¼" cubes added to column | 78 | 0.0515 | 0.0007 |
| | 116 | 0.0604 | 0.0005 |
| | 163 | 0.0666 | 0.0004 |
| | 259 | 0.0759 | 0.0003 |

The average leaching rate reported above is the average daily rate over the entire preceding period of days.

*Examples V to XV*

A series of experiments were performed to determine the effect of the choice of binder on the rate of leaching of trace element from our composition. In each of the several experiments, 81 percent by weight of a binder or mixture of binders were mixed with 9 percent by weight of N-lauryl, N'-lauryladipamide and 10 percent by weight of CuSO₄.5H₂O. The binder was mixed in liquid form and caused to solidify and was then comminuted into small, ¼ inch pieces. Compositions containing as binder only one material were prepared as described above from (1) paraffin wax, (2) beeswax, (3) polyethylene wax, (4) petrowax (microcrystalline wax), (5) candelilla wax, (6) ozokerite, (7) a petroleum pitch or asphalt, and (8) another petroleum pitch or asphalt. These were tested over a protracted period according to the method described in the previous specific examples. As previously mentioned, paraffin wax and polyethylene wax showed the highest rate of leaching, ozokerite and petrowax the lowest rate, and the others fell somewhere in between.

Blends of binders were then prepared in which 50 percent by weight of paraffin, of polyethylene, and of candelilla wax were mixed with 50 percent by weight of ozokerite. These were then incorporated with copper sulfate in the manner and the proportions described above and the so-prepared compositions were tested also in the described manner. An initial period of fourteen days to correspond to the rapid surface-leaching period was arbitrarily selected. The weight of material leached out in this period was determined and this amount was subtracted from total amounts leached in determining average leaching rates. The leaching tests were continued and, after an arbitrarily selected period of 83 days, or 69 days from the end of the first period, the cumulative weight of leached salt was determined. The rate of leaching during this relatively stable period was then determined and were compared to that of compositions having a single binder. The results were as follows:

TABLE III

| Example | Binder | Leaching Rate Over a Period of 69 Days/ Grams Per Day Per Gram of Composition ×10⁵ |
|---|---|---|
| V | 100% paraffin wax | 52 |
| VII | 100% polyethylene wax | 45 |
| IX | 100% candelilla wax | 32 |
| X | 100% ozokerite | 5 |
| XIII | 50% paraffin wax / 50% ozokerite | 2 |
| XIV | 50% polyethylene wax / 50% ozokerite | 8 |
| XV | 50% candelilla wax / 50% ozokerite | 7 |

These results show that salt leaches from paraffin-wax, polyethylene-wax, or candelilla-wax binders five to ten times as fast as it does from ozokerite, but that when 50 percent of ozokerite is blended with the first three binders, the leaching rate is, as well as can be determined, the same as that of 100 percent ozokerite.

The waxy synthetic wax or paraffin hydrocarbon constituting the matrix of our improved concatenated composition is inert to most substances and consequently is particularly well suited to serve as a carrier for compounds selected for the purpose of supplying trace elements to soil. Since the melting point of such resins, asphalt, or paraffin is relatively low either organic or inorganic trace-element compounds can be mixed with the molten wax without causing thermal decomposition of the compounds to a form, e.g., the oxides, not soluble in ground water. The relatively low specific gravity of resins and wax is advantageous since their carrier properties are directly proportional to the volume of the binder and thus a high proportion of trace elements can be carried by a relatively low weight of binder. Our composition is substantially inert to the action of bacteria or fungi. The gradual release of trace elements to the soil accomplished by our composition constitutes a considerable improvement over the sudden release and consequent waste of elements from capsule-type devices in which the water soluble content of the capsule is completely exposed at the moment the coating is perforated.

A composition having a preferred distribution of trace element compounds throughout the average particle is also within the scope of this invention. When the trace-element compounds are distributed in uniform concentration throughout the binder there is an initial tendency for the composition to yield trace elements to the soil at an excessive rate, so that some of the trace elements will be lost from the soil by leaching, run-off, or the like. On the other hand the final portions of the trace elements, that are deep within the individual particles, are released more slowly to the soil, possibly even at a rate insufficient to supply adequate soil nutrition. Our preferred composition exhibits an especially uniform rate of delivery of trace-elements from the individual particles. In this embodiment a wax or resin particle contains trace elements in an increasing average concentration as the distance from the surface of the particle increases. In other words, the concentration of trace elements at the core of the particle is greater than at the surface.

These improved particles of our composition can be prepared by various methods, for example, extruding a rod of wax or resin consisting of a core of higher trace-element concentration and an envelope of lower trace-element concentration. The rods can thereafter be broken into solid cylindrical shapes. As another method, stretched wires or wicks can be lowered successively into baths of molten wax or resin containing decreasing concentrations of trace elements and in each bath a layer of the composition of that bath can be deposited on the wire or cooled layer of solidified binder thereon. The wire can then be withdrawn from the concentric layers of hardened wax composition and the composition be broken into the smaller pieces. In yet another method, extruded balls of a wax composition containing a high concentration of trace element can be dropped into a bath of molten wax containing a lower concentration of the trace-element compound. If this process is repeated several times, a particle of substantially ideal trace-element distribution will be provided.

As can be noted in the foregoing specific examples, our composition can also include a bodying agent. Such an agent, which will aid in holding trace element particles in suspension in a molten or liquid binder during mixing and prior to solidification of the binder, comprises detergents or dispersing fillers. When the selected binder is a synthetic resin, plasticizers or other resin modifying agents can also be employed.

In usual practice, small, for example, quarter inch, solid particles of our composition are distributed to trace-element deficient soil. Molten resin or wax containing the trace-element compounds can also be distributed in fields, and coagulating droplets of the composition falling on the soil will then solidify and yield slowly its content of trace elements in a manner identical to that demonstrated in the foregoing specific examples.

Having described our invention, we claim:

1. A method of manufacturing a normally solid soil nutrient composition that will release a trace element to soil at a relatively uniform rate substantially equivalent to the rate at which the element can be absorbed by plants in the soil, the said method comprising melting a normally solid waxy water-insoluble binding material that melts at a temperature of less than about 150° C. and is selected from the group consisting of a waxy synthetic resin, asphalt, and wax, and mixing with a portion of the molten binding material a trace element in the form of finely divided water-soluble compound, adding trace element to at least one other portion of the molten binding material in a concentration less than that added to the material in the next preceding step, cooling and allowing to solidify the first said mixture of binding material and trace element, dividing the solidified mixture into particles, and coating the said particles with at least one layer of the mixture of binding material and trace element in lesser concentration.

2. A soil nutrient composition that will release a trace element to soil at a relatively uniform rate substantially equivalent to the rate at which the element can be absorbed by plants in the soil, said soil nutrient composition being prepared by melting a normally solid waxy water-insoluble binding material that melts at a temperature of less than about 150° C. and is selected from the group consisting of a waxy synthetic resin, asphalt, and wax, and mixing with a portion of the molten binding material a trace element in the form of finely divided water-soluble compound, adding trace element to at least one other portion of the molten binding material in a concentration less than that added to the material in the next preceding step, cooling and allowing to solidify the first said mixture of binding material and trace element, dividing the solidified mixture into particles, and coating the said particles with at least one layer of the mixture of binding material and trace element in lesser concentration.

References Cited in the file of this patent

UNITED STATES PATENTS

| | | |
|---|---|---|
| 831,591 | Aylsworth | Sept. 25, 1906 |
| 847,749 | Ellis | Mar. 19, 1907 |
| 1,864,672 | Rose et al. | June 28, 1932 |
| 1,882,377 | Whittelsey | Oct. 11, 1932 |
| 2,625,471 | Mowry et al. | Jan. 13, 1953 |
| 2,806,773 | Pole | Sept. 17, 1957 |

OTHER REFERENCES

Chemical Engineering—Agglomeration, October 1951, pages 161–174.